United States Patent

Reddy

[11] 3,795,384
[45] Mar. 5, 1974

[54] VALVE WITH AXIALLY MOVABLE VALVING TUBE AND LATERALLY MOVABLE VALVING WALL

[76] Inventor: Robert R. Reddy, 1195 Michillinda Ave., Pasadena, Calif. 91107

[22] Filed: Sept. 18, 1972

[21] Appl. No.: 289,997

[52] U.S. Cl. .................. 251/257, 251/315, 251/321
[51] Int. Cl. ......................................... F16k 31/524
[58] Field of Search ... 251/172, 174, 180, 228, 251, 251/253, 256, 257, 262, 263, 298, 309, 315, 318, 321

[56] References Cited
UNITED STATES PATENTS

| 3,220,694 | 11/1965 | Eschbaugh | 251/309 X |
| 3,404,864 | 10/1968 | Reddy | 251/172 |
| 3,591,129 | 7/1971 | Hulsey | 251/315 X |

*Primary Examiner*—Alan Cohan
*Assistant Examiner*—David R. Matthews
*Attorney, Agent, or Firm*—Frederick E. Mueller

[57] ABSTRACT

A valve having a body with an internal chamber and a first and a second port passing through the body into the chamber. A valving tube having an axis is axially movably mounted to the body inside the chamber, and has a tube passage connected to one of the ports. It has a free end with a valving seal that surrounds the end of the tube passage, and axial shifting of the tube moves the valving seal toward and away from a position where it can make sealing contact with a valving wall carried by a movable valve operator inside the chamber. The valving wall is movable laterally relative to the tube axis so it can be moved out of a direct flow path between the other of the ports and the free end of the valving tube. A cam is provided to shift the valving tube. Also, the valving tube may be moved by the cam so that its free end comes into abutment with the other of said ports when the valve is open, and thereby provides a direct conduit through the valve without a substantial change in cross-section. Also, optionally, mechanical means can be provided to force the valving seal against the valving wall.

24 Claims, 13 Drawing Figures

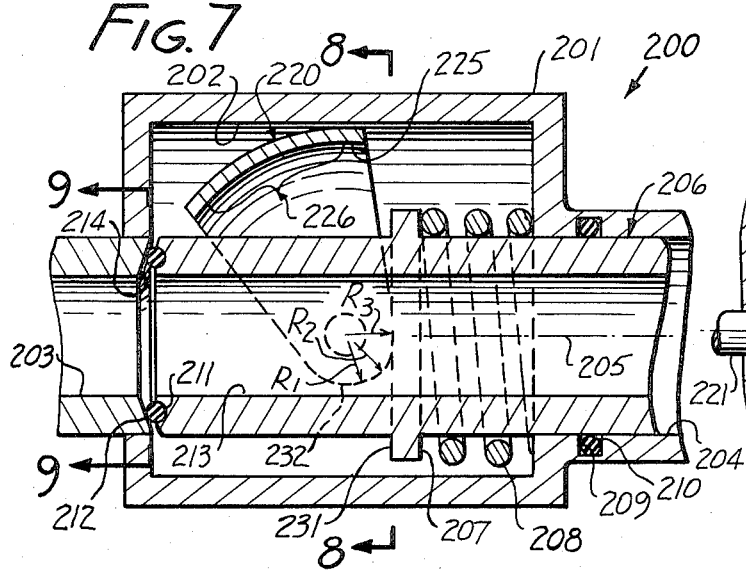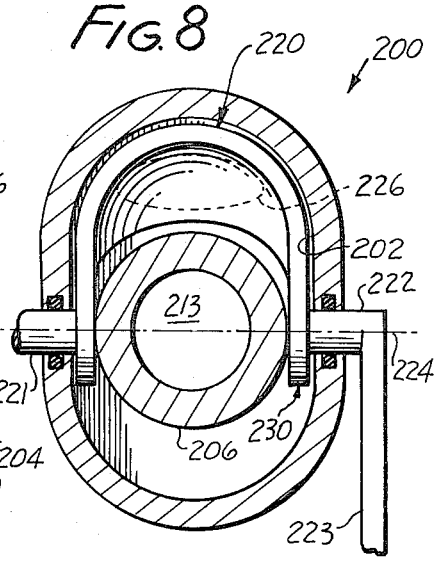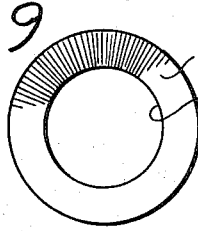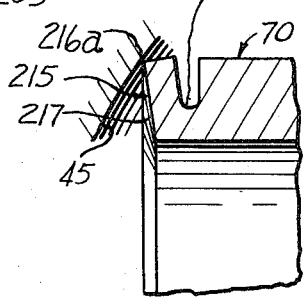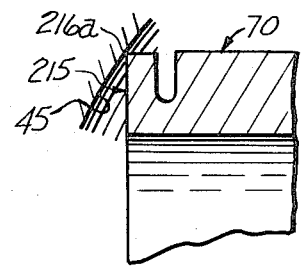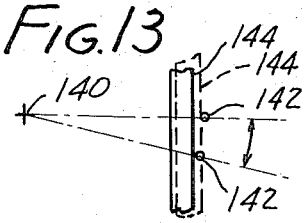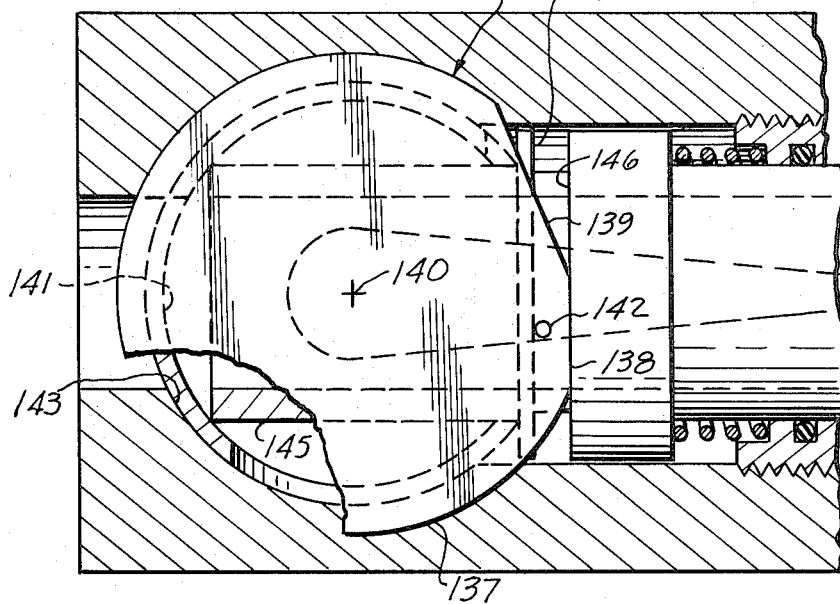

VALVE WITH AXIALLY MOVABLE VALVING TUBE AND LATERALLY MOVABLE VALVING WALL

This invention relates to a valve having an axially movable tube and a laterally movable valving wall which act together to open and close a valve of which they form a part, the tube being movable by cam means.

A valve with a valving tube which is axially movable (but is without means such as cams to cause such movement), and a laterally movable valving wall which closes the valve by making a sealing engagement with the free end of the valving tube is shown in U.S. Pat. No. 3,404,864, issued Oct. 8, 1968, to Robert R. Reddy, entitled "Rotary Valve with Concave Seating Surface." It is an object of this invention to expand the concept of this type of valve so as to utilize its many advantages, improve upon certain of its drawbacks, and to provide few functions for it.

One problem which has been found to be inherent in the aforesaid patented valve is that, when it is actuated, the valving seal on the end of the valving tube therein is caused to drag across a substantial area of the valving wall, and then across the sharp edge of a valving port. This can shorten the life of a valve seal. Valves of this type are frequently used to control dry gases and are without lubrication. The wear on the sealing surfaces caused by this dragging movement can be severe. It is desirable that valves of this type resist 100,000 cycles, and, therefore, it is necessary to reduce the causes of wear as much as possible.

It is an object of this invention to provide means for removing the force load from the valving seal when in contact with the valve operator, except when the valve is closed, or nearly closed, so as to overcome the aforesaid disadvantage of frictional wear. At the same time, it is possible to provide the valve with additional desirable features, among which are:

a. the provision of a positive closure force which will positively and mechanically force the valving tube into contact with the valve operator; and b. directly to connect, if desired, the valving tube to both of the ports so as to provide a continuous conduit of constant diameter through the valve when open.

A valve according to this invention includes a body having a chamber and a first port and a second port passing through said body into the chamber. A valving tube extends from one of said ports into the chamber. The valving tube has a tube axis and a tube passage in fluid communication with said one of said ports and with said chamber, and is axially shiftable in said body. A valve operator mounted in said chamber carries a valving wall. The valve operator is movably mounted so that the valving wall is movable laterally relative to the tube axis. A valving seal is carried on said valving tube adjacent to its free end, which is the end closer to the valving wall. The valving seal has a sealing perimeter which surrounds said tube passage. A closure region is formed on the valving wall which is congruent to said sealing perimeter. Within the closure region, the valving wall is imperforate. When the closure region and the sealing periphery are in abutment, the tube passage, and therefore the valve, is closed. A cam bearing a camming surface is mounted to the body, and a cam follower is formed on the valving tube. The camming surface and cam follower are so proportioned, disposed and arranged as to shift the valving tube axially, whereby to remove the valving seal from contact with the closure region in at least one relative position, and the valving tube is movable so that the valving seal makes contact with the closure region in another relative position. Means is provided to move the valve operator so that the valving wall moves laterally relative to the tube axis.

According to an optional feature of the invention, the valving tube may be shifted so as directly to interconnect with the other of said ports when the valve is fully open.

According to still another optional feature of this invention, mechanical means can be provided to force the valving seal against the valving wall.

The above and other features of this invention will be fully understood from the following detailed description and the accompanying drawings in which:

FIG. 1 is an axial cross-section of the presently preferred embodiment of the invention;

FIGS. 2, 3 and 4 are cross-sections taken at lines 2—2, 3—3 and 4—4 of FIG. 1, respectively;

FIG. 7 is a fragmentary view showing an optional feature of the invention;

FIGS. 8 and 9 are cross-sections taken at lines 8—8 and 9—9, respectively, of FIG. 7;

FIGS. 10 and 11 are fragmentary axial cross-sections showing a useful valve seal construction;

FIG. 12 is a plan view, partly in cutaway cross-section, showing another optional feature of the invention; and FIG. 13 is a schematic drawing showing the operation of the device in FIG. 12.

Figure 1:
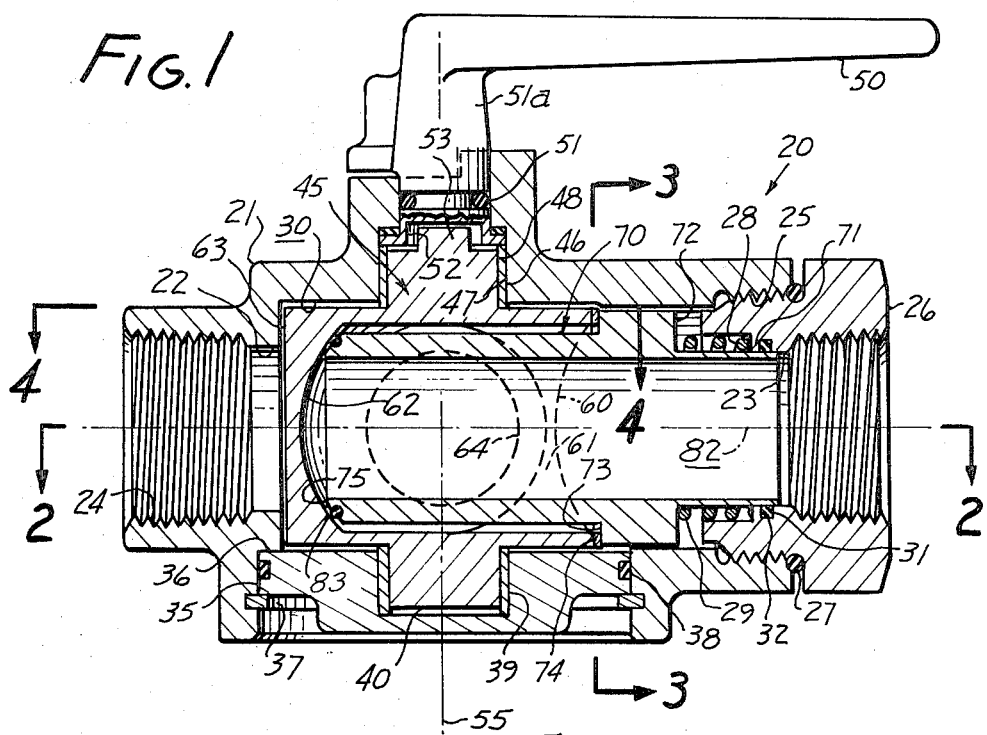

In FIG. 1, there is shown a valve 20 according to the invention. This valve bears a close resemblance to the valve shown in Reddy U.S. Pat. No. 3,404,864. The valve includes a body 21, a first port 22, and a second port 23, which ports pass through the body. In the preferred operation of this valve, port 22 functions as the inlet port, and port 23 as the outlet port, although with appropriate modifications, which will become apparent, the valve can be used to control flow in the opposite direction.

Threads 24, 25 are formed in ports 22 and 23, and a plug 26 is threaded into port 23, to press a sealing ring 27 against the body, and to form a backing shoulder 28 to back up a bias spring 29 inside a chamber 30 into which both ports open. A sliding seal 31 is fitted in a ring groove 32 in the inside wall of plug 26 for a purpose which will become apparent.

A bearing plate 35 is held in an opening 36 in the body by snap ring 37. A sealing ring 38 seals between the bearing plate and the wall of the opening. The bearing plate has a bearing 39 seated therein to receive a stud 40 on a valve operator 45 which will be more fully described below.

A second bearing 46 is fitted into an opening 47 at the top of the valve, and another stud 48 on the valve operator fits in the second bearing. A handle 50 projects outside the body and has a portion which passes into opening 47 with a sealing ring 51 surrounding it. The shaft 51a of the handle comprises means for rotating the valve operator. The lower portion of the handle has a slot 52 which receives a tang 53 on the upper end of stud 48 so that turning the handle will turn the valve operator around an axis of rotation 55.

Figure 6:
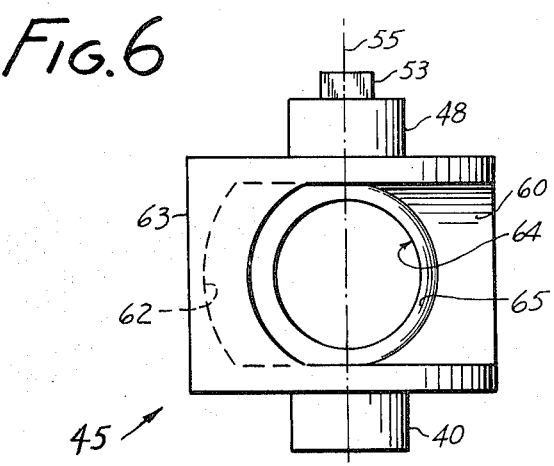
FIG. 6 is a side elevation of a portion of FIG. 1.

The valve operator includes an internal valving wall 60 (FIGS. 1 and 6) which bounds a portion of a valving cavity 61. It includes a closure region 62, which is a completely imperforate surface. The valve operator also includes an external boundary wall 63. A valving port 64 extends through the wall operator between the two walls, interconnecting them. The valving port lies outside the closure region. The valving port has a limiting edge 65 at its intersection with the internal valving wall. A substantial sealing region 66 (see FIGS. 1 and 2) is formed in the annular wall immediately surrounding the closure region, which is a surface of revolution generated around axis of rotation 55. This may be the same class of surface as is shown in the aforesaid Reddy patent and may be toroidal, because this is a simple form to generate in metal or plastic. However, other surfaces of revolution are also suitable for use, such as cylinders. The closure region 62 and the valving port are spaced angularly apart from one another around the said axis of rotation. It will be noted that rotation of the valve operator can laterally move the valving port or the closure region into or out of alignment with port 22 and the axis 82 of a valving tube 70.

A valving tube 70 extends into the chamber and into the valving cavity from second port 23. It is fitted to the body in port 23, and includes a cylindrical neck 71 which makes a sliding fluid contact with sliding seal 31. The tube also includes a shoulder 72, against which bias spring 29 bears. A second shoulder 73 backs a bearing washer 74, which is a cam follower. For optimum wear, the bearing washer may be made of Delrin.

The valving tube extends to a free end 75 which is the end closer to the valving wall. Adjacent to the free end, there is provided on the valving tube a valving seal 80 which extends peripherally around a tube passage 81. Tube passage 81 extends axially from end to end of the valving tube along tube axis 82. The valving seal has a sealing perimeter 83 which is its line of contact with the sealing region, and this sealing perimeter and the sealing region are congruent to and in full peripheral contact with one another when the valve is closed. Such contact will prevent flow of fluid from the chamber into the valving tube or from the valving tube into the chamber.

Figure 5:
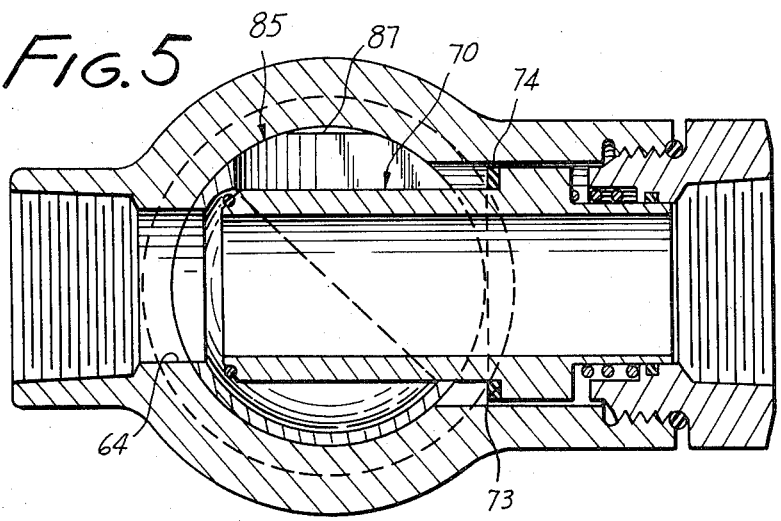
FIG. 5 is a view similar to FIG. 4 with the valve shown in its open instead of in its closed position.

The valving tube is axially movable on its axis 82, toward and away from the valving wall, and is biased toward the valving wall by bias means. The bias means is shown in two forms which may be used alternatively or together, namely, bias spring 29, or the differential fluid pressure derived from pressure within chamber 30 exerted on shoulder 72. The chamber is always open to inlet pressure, so this provides a constant bias force. The external surface of neck 71 has a lesser outer diameter than the diameter of the sealing perimeter, whereby a net force to the left in FIGS. 1 and 5 is generated when pressure in the chamber is higher than pressure at port 23. These are two forms of bias means to bias the tube toward the valving surface.

Figure 4:
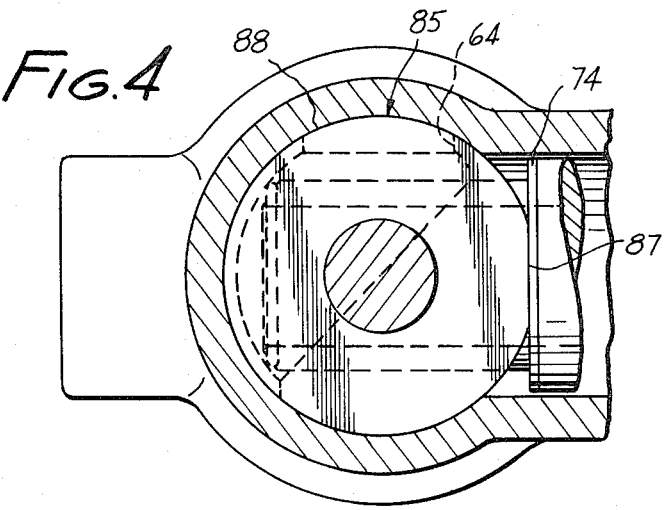

A cam 85 is formed integrally with the valve operator inside the chamber, as best shown in FIG. 4. The cam has a camming surface with a relieved portion 87 and a rise portion 88. The camming surface is adapted to bear against bearing washer 74 and through it against shoulder 73. When the rise portion is in contact with the shoulder as shown in FIG. 5, which is the valve-open position, the valving tube will be shifted to the right, away from the valving wall. When the relieved portion 87 is in contact with the bearing washer (sometimes called a "cam follower") as shown in FIG. 4, which is the valve-closed position, then the valving tube is free to be moved toward and against the valving wall by the bias force. Because cam 85 is integral with the valve operator, it turns with it at all times.

Under some circumstances, a positive mechanical closure force is desirable. For example, in FIG. 1 it is at least theoretically possible for the valving tube to "hang up" in a retracted position. Also, it may be desirable to use a deflectible valving seal, such as is shown in FIGS. 10 and 11, and an axial compressive force on it will provide a more reliable seal. Accordingly, a valve 135 (FIG. 12) is formed substantially identical to the valve of FIG. 1 with the exception that cam 136 has a rise portion 137 and two relieved portions 138, 139, portion 139 lying closer to the axis of rotation 140 (normal to the plane of FIG. 12) than portion 138. This will permit the valving tube to move farther toward the valving wall 141 than would relieved portion 138. A pin 142 is fixed to the cam and projects into chamber 143 in such manner as to engage the right-hand face of a shoulder 144 on valving tube 145 which will force the shoulder, and thereby the tube, to the left when the cam is turned clockwise from the illustrated position. Relieved portion 139 will permit cam follower 146 and the tube to move to the left when pressed by the pin. The length of the pin is such that it clears shoulder 144 as it travels clockwise to the position of FIG. 12, or counterclockwise away from it. Clockwise movement of the handle from the position of FIG. 12 will cause the further positive movement of the valving tube. It will be accompanied by a sliding movement between the valving seal and the sealing region which, while not particularly desirable, can be tolerated in the interest of making a more positive seal. Usually, no more than about 70 of clockwise rotation from the position of FIG. 12 is needed.

The additional axial movement of the valving tube may either be allowed for by the use of a resilient valving seal, or of a flexible one, or by a combination of these. The purpose is to enable the handle 147 to act as an overtravel means to move the pin 142 in a retrograde direction toward the left in FIG. 12 so as positively to force the valving tube against the valving wall. With this exception, this valve may be made identical to either the embodiments of FIGS. 1 or 7. FIG. 13 illustrates the relative axial positions of pin 142 in two angular positions of the handle.

An example of a resilient seal is an elastomeric ring. An example of a flexible seal is shown in FIGS. 10 and 11, wherein the material of the valving tube is inherently flexible in suitably small sections, and the valving seal is an integral part of the valving tube. Alternatively, the valving seal may be separate from, but attached to the valving tube. As shown, a groove 216 is cut in the tube a short distance away from the free end, and in the free and undistorted shape (FIG. 10), a sharp sealing edge 216a is formed at the outside of a tapered end face 217. If desired, a garter spring can be fitted in this groove to bias the sealing edge to the illustrated position. In FIG. 10, the valving tube is shown retracted from valving wall 66, and the valve operator in the fully open position. In FIG. 11, the valve is shown closed and compressed by overtravel of the handle and of the valving tube so that the end face is deflected thereby having permitted the valving tube to travel axially.

FIGS. 7–9 show another embodiment of the invention, wherein the valving tube can be directly joined to the inlet port so as to provide a straight-through conduit when the valve is open. This will minimize any pressure drop through the valve. This valve is generally similar to the valve of FIG. 1, and its description will therefore be limited to those features unique to this embodiment.

Valve 200 has a body 201 which encloses a valving cavity 202. A first port 203 and second port 204 pass through the body and enter the cavity. They are coaxial on axis 205, which is also the tube axis of valving tube 206.

Valving tube 206 has an external shoulder 207 against which a bias spring 208 bears to bias the valving tube to the left in FIG. 7. Different bias means can be used instead of the spring, or in addition to it, as in the other embodiments. Valving tube 206 is axially slidable in port 204. A ring groove 209 holds an O-ring 210 to make a fluid seal between the body and the valving tube.

The free end 211 of the valving tube carries a valving seal 212 which extends peripherally around tube passage 213. The valving seal lies in a plane, and is resilient. It will form a perimetrical sealing line which is continuous around the valving tube. Instead of this resilient seal, the flexible seal of FIG. 10 may be used on the free end, or any other type of perimeter seal which will permit axial movements of the valving tube while the seal is in contact with a sealing region.

A valving seat 214 is formed around port 203 against which the valving seal can bear to make a peripheral seal when the valve is open as shown in FIG. 7.

A valve operator 220 has a pair of shafts 221, 222 journaled in the body, to one of which is attached a handle 223 to turn the valve operator around an axis of rotation 224. The valve operator includes an internal valving wall 225 with an imperforate closure region 226. It need not have a valving port. The valving wall may conveniently be the same class of surface as shown in the said Reddy patent, but in any event, that part of the closure region which is engaged by the valving seal should be congruent to it, i.e., the valving seal should made a continuous contact with it all the way around the tube passage. FIG. 7 shows that the valving wall may be moved laterally away from the valving tube to open the valve, and into the path of the valving tube to close the same.

Cam means 230 is formed on the valve operator, and is so disposed and arranged relative to cam follower 231 (the left hand face of the shoulder, or the side of a washer which bears against it), that a cam 232 will shift the valving tube when the valve operator is rotated.

The cam has three principal radii relative to axis 224, $R_1$, $R_2$, and $R_3$. $R_1$ is such as to permit the contact of the valving seal and seat as shown in FIG. 7. $R_2$ is such as to retract the valving seal out of contact with the valving wall except when the valve is closed. $R_3$ is such as to permit the bias spring to press the valving seal against the closure region when the valve operator is rotated so as to place the closure region with the area bounded by the valving seal. Therefore, when that portion of the cam with a throw equal to $R_1$ contacts the cam follower, the closure region will be in the path of the valving tube, and the valving tube will be pressed against the valving wall by the bias spring. When the valve operator is turned slightly to open the valve, that portion of the cam having the throw $R_2$ moves the valving tube back out of contact with the valve operator. When the valve operator has cleared the valving tube, that portion of the cam having the throw $R_3$ is contacted by the cam follower, and the valving tube moves to the position illustrated in FIG. 7. These are the parameters for selecting the length of throws $R_1$, $R_2$ and $R_3$.

Figure 2:
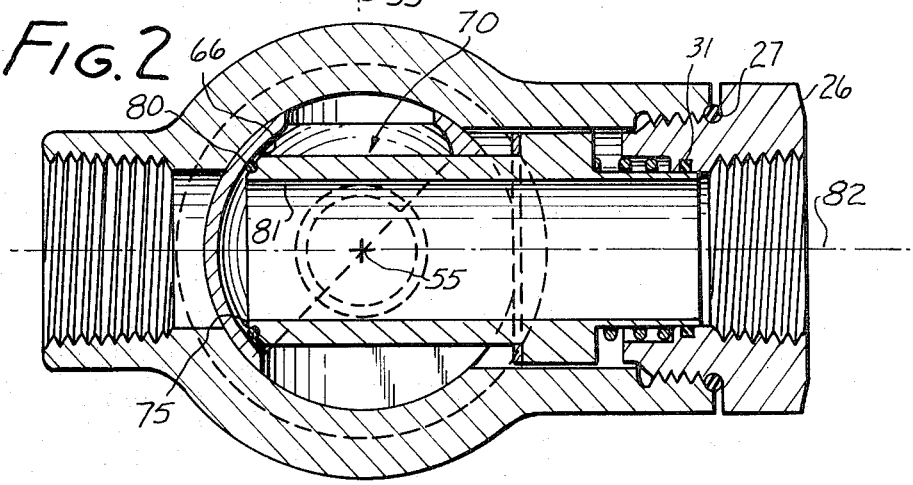
Figure 3:
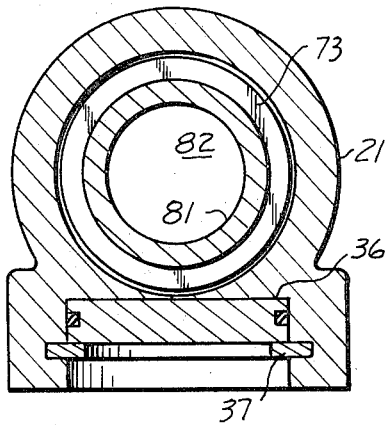

The operation of the valves will now be described. In FIGS. 1 and 2, the valve is shown in its closed position. The fluid differential pressure exerted on shoulder 72 will bias the tube toward the left in FIG. 1, i.e., against the valving wall, when the greater pressure is in port 22 and, therefore, in chamber 30. The bias spring will exert such a force constantly. The valve is reliably closed by either means. Should the pressure differential be reversed, so that the higher pressure is at port 23, it is only necessary to provide sufficient spring force in the bias means to hold the valve closed under the intended operating pressures.

To open the valve, the handle is turned counter-clockwise in FIG. 2. The relief portion 87 will leave contact with the cam follower, and the rise portion will come into contact with it. Accordingly, the valve tube will be moved to the right. The amount of this shift need not be great, and usually will be on the order of only a few thousandths of an inch. The objective is not to open the valve by moving the valving tube (although it does so slightly), but instead to remove the valving seal from wearing contact with the valving wall. As to this feature, it is also an object to prevent the dragging of the valving seal over the limiting edge of the valving port, which could cut the valving seal. Accordingly, the location and dimensions of the closure region and of the limiting edge are selected such that, even though in the arrangement shown in FIG. 1 there will be some sliding contact between the valving seal and the valving wall at the closure region, just prior to final closure or initial opening, the valving seal will not drag over the limiting edge, the retraction of the valving tube being sufficient to clear the valving wall before the valving port comes into registration with the tube passage. It will also relieve the contact except for a very small arc of rotation compared to the continuous rubbing contact with valve shown in the said Reddy patent.

As the valve is turned from its closed position of FIGS. 1 and 2 to the open position of FIG. 5, the valving port will increasingly come into axial registration with the tube passage until, when the valve is fully open, there is a substantially straight-through flow of fluid with a minimum of pressure drop. It will be understood that the valve may be used as a throttling valve by bringing the valving ports into only partial registration, even though there remains a clearance between the end of the valving tube and the valving wall.

When the valve is to be closed, the handle is turned clockwise, and the relief portion 87 of the cam will come into contact with the cam follower and will permit the valve tube to be moved against the closure region by the bias force.

The distinction of the device of FIG. 12 from the other embodiments is that, as the handle is moved over center, i.e., beyond the horizontal arrangement in FIG. 12, the pin will have a component of motion to the left instead of to the right, and as a consequence, will exert a force to positively press the valving tube toward and against the valving wall. The dimensions and locations of the pin and of the shoulder 144 are selected such that the pin will clear the shoulder except when it is in the position as shown in FIG. 10 and farther clockwise. The freedom for the valving tube to move to the left in this latter portion of the handle rotation is provided by the resilience or flexibility of the valving seal.

The operation of the embodiment of FIG. 7 should be evident from the description of it which is given above.

This invention provides a valve of the class described in which operating torques are low, wear on the valving seals is reduced below the wear which occurs in previously known constructions, and in which pressure drops can be minimized, and approach those of the inlet and outlet pipes.

This invention is not to be limited by the embodiments shown in the drawings and described in the description, which are given by way of example and not of limitation, but only in accordance with the scope of the appended claims.

I claim:

1. A valve comprising: a body having a chamber and a first port and a second port passing through said body to the chamber; a valve operator movably mounted in said chamber and carrying a valving wall; a valving tube extending from one of said ports into the chamber and into a valving cavity of said valve operator, said tube having an axis and an axial tube passage in fluid communication with said one of said ports, and being axially shiftable in said body, the valve operator being laterally movable relative to the tube axis; a valving seal adjacent to the end of said valving tube which is closest to the valve operator, said seal having a sealing perimeter which surrounds said tube passage; closure region on said valving wall which is congruent to the said sealing perimeter, and within which closure region the valving wall is imperforate, whereby when the closure region and sealing periphery are in abutment, the tube passage, and therefore the valve, are closed; a rotatable cam bearing a camming surface thereon; a cam follower on the valving tube, the camming surface and cam follower being so proportioned, disposed and arranged as to shift the valving tube axially when the cam is rotated, whereby to remove the valving seal from contact with the closure region when the valve is opened, and to return it to abutting contact therewith when the valve is closed.

2. A valve according to claim 1 in which the cam and the valve operator are rigidly joined, whereby to turn simultaneously with one another.

3. A valve according to claim 2 in which a substantial area of the valving wall adjacent to the closure region is a concave surface of revolution generated around the said axis of rotation, to which area the sealing periphery is congruent.

4. A valve according to claim 1 in which bias means biases the valving tube toward the valve operator.

5. A valve according to claim 4 in which said bias means is a spring.

6. A valve according to claim 4 in which said bias means is a differential area on the valving tube exposed to pressure in said chamber.

7. A valve according to claim 1 in which thrust means is attached to the valve operator which is so disposed and arranged as to contact the valving tube and thrust it against the valving wall when the valve is closed.

8. A valve according to claim 7 in which the thrust means comprises an abutment and in which an abutment is formed on the valving tube, these abutments making contact with one another to force the valving tube toward the valving wall.

9. A valve according to claim 8 in which bias means biases the valving tube toward the valve operator.

10. A valve according to claim 7 in which the valving seal can yield axially relative to the valving tube axis to permit the valving tube to move axially while the valving seal is in contact with the valving wall.

11. A valve according to claim 10 in which the thrust means comprises an abutment and in which an abutment is formed on the valving tube, these abutments making contact with one another to force the valving tube toward the valving wall.

12. A valve according to claim 10 in which bias means biases the valving tube toward the valve operator.

13. A valve according to claim 1 in which the cam means permits the valve tube to engage the body at said other of the ports whereby said ports are connected only by the valving tube when the valve is fully open.

14. A valve according to claim 13 in which bias means biases the valving tube toward the valve operator.

15. A valve according to claim 13 in which thrust means is attached to the valve operator which is so disposed and arranged as to contact the valving tube and thrust it against the valving wall when the valve is closed.

16. A valve according to claim 15 in which the valving seal can yield axially relative to the valving tube axis to permit the valving tube to move axially while the valving seal is in contact with the valving wall.

17. A valve comprising: a body having a chamber and a first port and a second port passing through said body to the chamber; a valve operator mounted in said chamber and rotatable around an axis of rotation; an internal valving wall defining a valving cavity in said valve operator; an external boundary wall on said valve operator; a valving port extending through the valve operator and interconnecting said walls, said valving port having a limiting edge at its intersection with the valving wall; a valving tube extending from one of said ports into the chamber and into the valving cavity, said tube having an axis and an axial tube passage in fluid communication with said one of said ports, and being axially shiftable in said body; a valving seal adjacent to the end of said valving tube which is closest to the valve operator, said seal having a sealing perimeter which surrounds said tube passage; a closure region on said valving wall which is congruent to the said sealing perimeter, and within which closure region the valving wall is imperforate, whereby when the closure region and sealing periphery are in abutment, the tube passage, and therefore the valve, are closed; a rotatable cam bearing a camming surface thereon; a cam follower on the valving tube, the camming surface and cam follower being so proportioned, disposed and arranged as to shift the valving tube axially when the cam is rotated, whereby to remove the valving seal from contact with the closure region when the valve is opened, and to return it to abutting contact therewith when the valve is closed, the limiting edge of said valving port lying outside the sealing periphery when the valve is closed, the valving port moving into at least partial alignment with the tube passage when the valve is opened.

18. A valve according to claim 17 in which the cam and the valve operator are rigidly joined, whereby to turn simultaneously with one another.

19. A valve according to claim 18 which the location and dimensions of the limiting edge of the valving port are such that the valve seal never contacts the limiting edge.

20. A valve according to claim 18 in which a substantial area of the valving wall adjacent to the closure region is a concave surface of revolution generated around the said axis of rotation, to which area the sealing periphery is congruent.

21. A valve according to claim 17 in which bias means biases the valving tube toward the valve operator.

22. A valve according to claim 21 in which said bias means is a differential area on the valving tube exposed to pressure in said chamber.

23. A valve according to claim 21 in which said bias means is a differential area on the valving tube exposed to pressure in said chamber.

24. A valve according to claim 17 in which thrust means is rotatably mounted to the body which is so disposed and arranged as to contact the valving tube and thrust axially so the valving seal is assured of contact with the closure region.

* * * * *